United States Patent
Winger et al.

(10) Patent No.: US 7,949,044 B2
(45) Date of Patent: May 24, 2011

(54) METHOD FOR COEFFICIENT BITDEPTH LIMITATION, ENCODER AND BITSTREAM GENERATION APPARATUS

(75) Inventors: Lowell L. Winger, Waterloo (CA); Guy Cote, Elora (CA)

(73) Assignee: LSI Corporation, Milpitas, CA (US)

( * ) Notice: Subject to any disclaimer, the term of this patent is extended or adjusted under 35 U.S.C. 154(b) by 1564 days.

(21) Appl. No.: 11/104,070

(22) Filed: Apr. 12, 2005

(65) Prior Publication Data

US 2006/0227867 A1  Oct. 12, 2006

(51) Int. Cl.
H04N 11/04 (2006.01)
G06K 9/36 (2006.01)
(52) U.S. Cl. .................. 375/240.03; 382/251
(58) Field of Classification Search ............... 348/415, 348/416, 720, 721, 714, 715, 716, 420, 421, 348/403, 402, 409, 384, 401, 405, 406, 408, 348/419, 438; 382/56, 239, 282, 283, 250, 382/248, 251, 232, 233, 246, 254, 276; 375/240, 375/240.03, 240.12, 240.24, 240.18, 240.23, 375/240.26, 240.25
See application file for complete search history.

(56) References Cited

U.S. PATENT DOCUMENTS

| | | | | |
|---|---|---|---|---|
| 5,592,302 A * | 1/1997 | Hirabayashi | | 382/236 |
| 5,768,537 A * | 6/1998 | Butter et al. | | 709/247 |
| 7,403,561 B2 * | 7/2008 | Kottke et al. | | 375/240 |
| 7,418,147 B2 * | 8/2008 | Kamaci et al. | | 382/251 |
| 2003/0007563 A1 * | 1/2003 | Ryu | | 375/240.13 |
| 2005/0147172 A1 * | 7/2005 | Winger et al. | | 375/240.23 |
| 2005/0249291 A1 * | 11/2005 | Gordon et al. | | 375/240.18 |
| 2005/0259729 A1 * | 11/2005 | Sun | | 375/240.1 |
| 2006/0257034 A1 * | 11/2006 | Gish et al. | | 382/239 |
| 2008/0075166 A1 * | 3/2008 | Gish et al. | | 375/240.13 |

* cited by examiner

*Primary Examiner* — Behrooz Senfi
(74) *Attorney, Agent, or Firm* — Christopher P. Maiorana, PC

(57) ABSTRACT

A method for coefficient bitdepth limitation in an encoder and/or bitstream generation apparatus including the steps of (A) generating one or more residual block coefficients in response to a video signal and one or more coding parameters and (B) manipulating the one or more coding parameters such that the one or more residual block coefficients are prevented from having values greater than a bitdepth of the video signal plus a predefined number of bits.

20 Claims, 3 Drawing Sheets

METHOD FOR COEFFICIENT BITDEPTH LIMITATION, ENCODER AND BITSTREAM GENERATION APPARATUS

FIELD OF THE INVENTION

The present invention relates to video compression generally and, more particularly, to a method for coefficient bitdepth limitation in an encoder and bitstream generation apparatus.

BACKGROUND OF THE INVENTION

ITU-T Revised Rec. H.264(E):2005 "Advanced video coding for generic audiovisual services," Feb. 28, 2005 (H.264V2), specifies that bitstreams not contain data that will result in certain quantities (or variables) overflowing 16-bits. However, the H.264V2 specifies no encoding methods to guarantee that the variables are not larger than 15-bits plus a sign bit. Conventional encoders do not specify a 16-bit limit on coefficients because bitstreams compliant with earlier drafts of the H.264-AVC Fidelity Range Extensions could contain 17-bit coefficients.

It would be desirable to have a method for coefficient bitdepth limitation that can be implemented in an encoder and/or bitstream generation apparatus.

SUMMARY OF THE INVENTION

The present invention concerns a method for coefficient bitdepth limitation in an encoder and/or bitstream generation apparatus including the steps of (A) generating one or more residual block coefficients in response to a video signal and one or more coding parameters and (B) manipulating the one or more coding parameters such that the one or more residual block coefficients are prevented from having values greater than a bitdepth of the video signal plus a predefined number of bits.

The objects, features and advantages of the present invention include providing a method for coefficient bitdepth limitation, an encoder and a bitstream generation apparatus that may (i) provide multiple options for producing an H.264V2 compliant bitstream, (ii) specify that residual 4×4 or 8×8 coefficient blocks may not overflow 16, 18, or 20 bits, (iii) avoid overflows in an encoder by manipulating any of qP, weightscale, bitrate, macroblock mode, (iv) avoid overflows in an encoder through coefficient clipping, (v) be simple to implement, (vi) enable arbitrary fidelity (up to and including lossless encoding) without restriction, (vii) provide maximum control of what measures are enforced to prevent 16-bit overflows and/or (viii) force compliance of the bitstreams.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
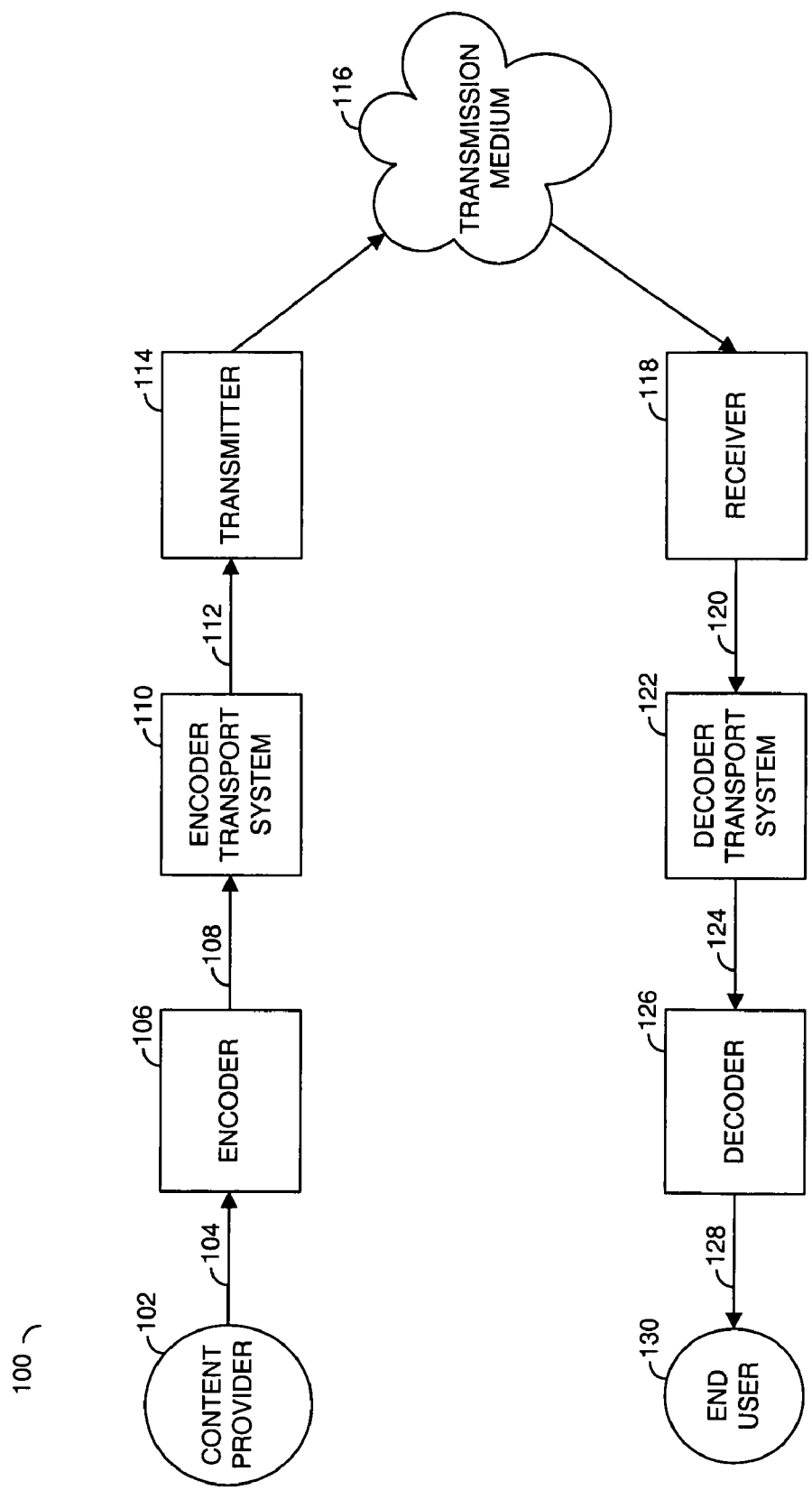
FIG. 1 is a block diagram illustrating various components of a compressed video system in which one or more preferred embodiments of the present invention may be implemented.

Referring to FIG. 1, a block diagram of a system 100 is shown illustrating components of a compressed video system in which one or more preferred embodiments of the present invention may be implemented. In general, a content provider 102 presents video image, audio or other data to be compressed and transmitted in a data stream 104 to an input of an encoder 106. The encoder 106 may be configured to generate a compressed bitstream 108 in response to the input stream 104. In one example, the encoder 106 may be configured to encode the data stream 104 according to one or more encoding standards including ITU-T Revised Rec. H.264(E): 2005 "Advanced video coding for generic audiovisual services," Feb. 28, 2005 (H.264V2). The encoder 106 may be further configured to generate the bitstream 108 using a transformation and quantization process implemented such that one or more coefficient values are limited in accordance with the present invention.

The compressed bitstream 108 from the encoder 106 may be presented to an encoder transport system 110. An output of the encoder transport system 110 generally presents a signal 112 to a transmitter 114. The transmitter 114 transmits the compressed data via a transmission medium 116. In one example, the content provider 102 may comprise a video broadcast, DVD, or any other source of video data stream. The transmission medium 116 may comprise, for example, a broadcast, cable, satellite, network, DVD, hard drive, or any other medium implemented to carry, transfer, and/or store a compressed bitstream. In one example, the encoder 106, encoder transport 110 and transmitter 114 may be implemented as a stand alone apparatus (e.g., an authoring tool) or as part of a video recorder/player apparatus.

On a receiving side of the system 100, a receiver 118 generally receives the compressed data bitstream from the transmission medium 116. The receiver 118 presents an encoded bitstream 120 to a decoder transport system 122. The decoder transport system 122 generally presents the encoded bitstream via a link 124 to a decoder 126. The decoder 126 generally decompresses (or decodes) the data bitstream and presents the data via a link 128 to an end user hardware block (or circuit) 130. The end user hardware block 130 may comprise a television, a monitor, a computer, a projector, a hard drive, a personal video recorder (PVR), an optical disk recorder (e.g., DVD), or any other medium implemented to carry, transfer, present, display and/or store the uncompressed bitstream (e.g., decoded video signal). In one example, the receiver 118, decoder transport 122 and decoder 126 may be implemented as part of a video recorder/player apparatus.

Figure 2:
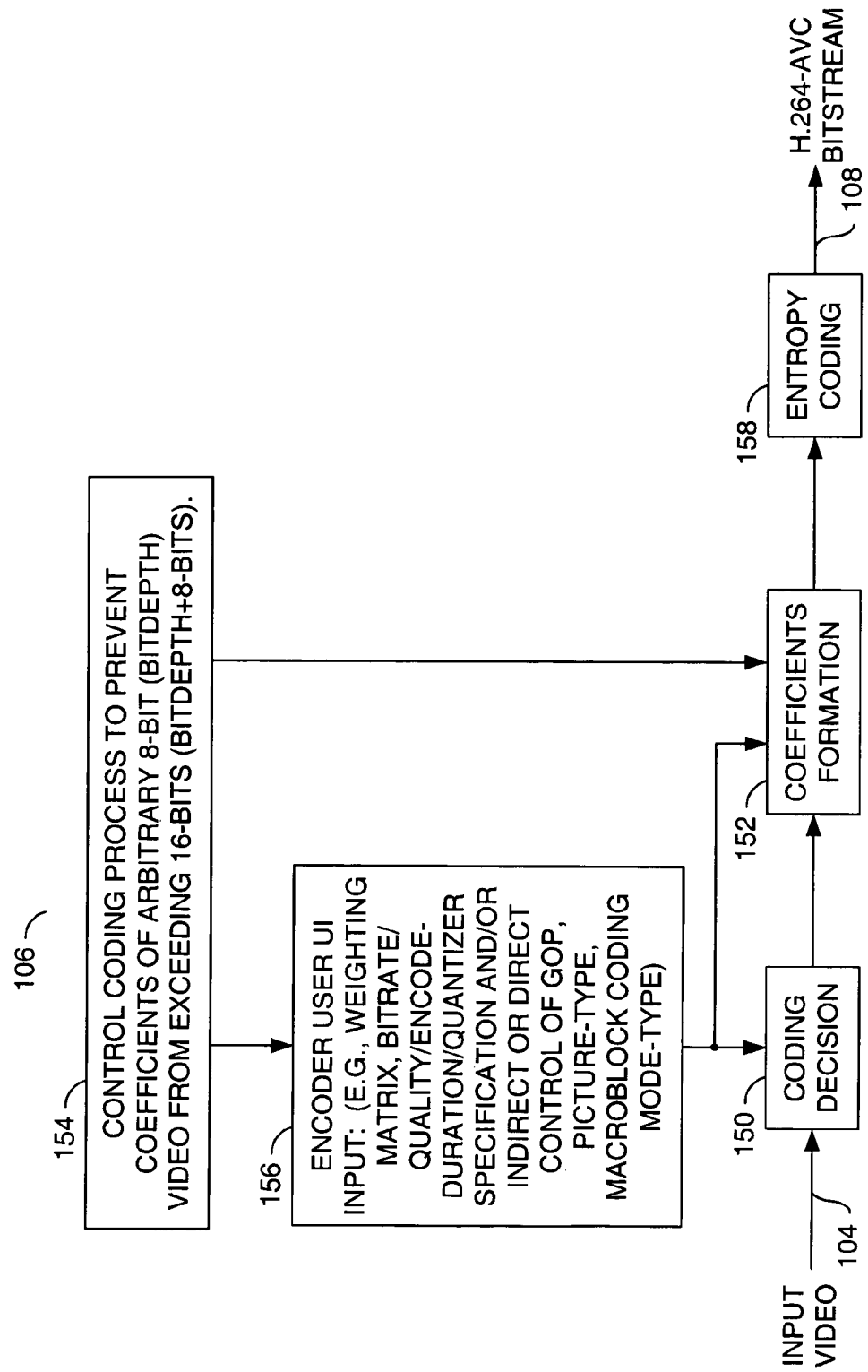
FIG. 2 is a flow diagram illustrating an example encoder in accordance with a preferred embodiment of the present invention.

Referring to FIG. 2, a flow diagram is shown illustrating an example encoder 106 of FIG. 1 in accordance with a preferred embodiment of the present invention. The encoder 106 may comprise a circuit (or block)) 150, a circuit (or block) 152, a circuit (or block) 154, a circuit (or block) 156 and a circuit (or block) 158. The block 150 may be implemented as a coding decision circuit (or process). The block 152 may be implemented as a coefficient formation circuit (or process). The block 154 may be implemented as a control circuit (or process). The block 156 may be implemented as a user input (UI) circuit (or process). The block 158 may be implemented as an entropy coding circuit (or process).

The block 150 may be configured (i) to receive an input data stream (e.g., a video stream, etc.) and (ii) to make coding decisions with respect to the input data stream based on a number of parameters (e.g., weighting matrix, bitrate, quality, encode-duration, quantizer specification, group-of-picture, picture type, macroblock coding mode, etc.). The block 152 may be configured to generate (or form) one or more coefficients (e.g., residual 4×4 block coefficients, etc.) in response to data received from the block 150 and a number of parameters (e.g., weighting matrix, quantizer specification, macroblock coding mode, etc.).

The block 154 may be configured to control the operations of the block 150 and the block 152 (e.g., by generating one or more control signals, manipulating one or more parameters, etc.). In one example, the block 154 may be configured to prevent coefficients generated in response to an arbitrary 8-bit, 10-bit or 12-bit video input stream from exceeding 16 bits, 18 bits, or 20 bits, respectively (e.g., video bitdepth+8 bits). For example, the block 154 may be configured to manipulate (or control) any of the number of coding parameters (e.g., weighting matrix, bitrate, quality, encode-duration, quantizer specification, group-of-picture, picture type, macroblock coding mode, etc.) via the user input block 156.

In one example, the block 154 may be configured to manipulate quantization parameters (e.g., qP) and weighting matrix values (e.g., LevelScale) to limit coefficient values for 4×4 and/or 8×8 residual blocks based on profile and/or bitstream format (e.g., video bitdepth+8 bits). In general, uncontrolled coefficients (e.g., cij) may be up to 19.53 bits (e.g., qP=0 and LevelScale=1). In one example, the block 154 may be configured to set the values of qP and LevelScale according to the following Equations 1 and 2:

$$\log_2(\text{LevelScale})+qP/6>\text{Max\_potential\_overflow} \quad \text{Eq. 1}$$

$$\text{LevelScale}=\text{weightScale}*\text{normAdjust}, \quad \text{Eq. 2}$$

where Max_potential_overflow represents a predetermined overflow threshold for the current block (or current coefficient), weightscale represents programmable constants and normAdjust represents predetermined fixed constants. For example, Max_potential_overflow may be set based upon the bitdepth of the input video (e.g., Max_potential_overflow=Max_potential_bit_depth−coefficient_bit_depth). The fixed constants of normAdjust may be specified by a particular compression standard. The programmable constants represented by weightscale may be specified by an encoder user.

The threshold Max_potential_threshold should be set based upon the actual maximum overflow for the current block (or even the current coefficient) in order to exert the proper encoder control over the parameters that effect overflow. The threshold Max_potential_bitdepth is generally calculated for each coefficient of both the 4×4 and 8×8 transforms for each of the potential cases. For example, the maximum coefficient for the 4×4 transform with 8-bit input is 17.68 bits with High Profile and the maximum coefficient with the 8×8 transform with 8-bit input is 17.2041.

Depending on the mode chosen for the current macroblock, a different value may be used. For example, when the current macroblock is coded as an 8×8, a threshold value of 1.2041 may be used for controlling the combination of qP and LevelScale. When the current macroblock is coded as 4×4, the threshold value selected may depend upon the mode. For example, when the mode is Intra16×16, a threshold value of 1.68 should be used. However, when the mode is not Intra16×16, a threshold value of 0.68 may be used. In general, the maximum of the chroma and the luma limit for the current macroblock is used to determined the threshold value. However, for the non-Intra16×16 4×4 macroblock modes the chromaDC maximum overflow should be used, because the chromaDC maximum overflow is generally larger than the largest luma overflow for the non-Intra16×16 4×4 macroblock modes. In one example, the threshold Max_potential_overflow may be implemented with the following values: for 4×4lumaAC: 0.2041 bits; for chromaDC (always 4×4): 0.68 bits; for lumaDC (always 4×4): 1.68 bits; for 8×8lumaAC: 1.2041.

While qP may be controlled on a macroblock basis, and LevelScale on a higher-level basis, the encoder 106 may be further configured to clip coefficients to prevent overflow. For example, a coefficient level control may be implemented to prevent overflow. Alternatively, the current qP and LevelScale may be used to limit the potential macroblock-types available for the current macroblock. For example, when the encoder 106 makes both qP and LevelScale small, the encoder 106 may be configured to limit macroblock types to 4×4 non-Intra16×16.

In one example, LevelScale may be implemented such that LevelScale>=min_level_scale, where min_level_scale is determined by either (i) observing the inequality log 2(LevelScale)>max_potential_overflow (e.g., derived from Equation 1 by setting qP=0), (ii) the inequality qP/6>max_potential_overflow (e.g., derived from Equation 1 by setting LevelScale=1) or (iii) the inequality log 2(LevelScale)>max_potential_overflow−2/6 (e.g., derived from Equation 1 by setting qP>=2). In general, the equation does not change for 8-bit, 10-bit, or 12-bit input, since the number of bits of overflow remains constant irregardless of the input bitdepth since the coefficient sizes also scale up accordingly.

In one example, the fixed constants represented by normAdjust may be configured to modify the quantization step size for each individual frequency coefficient. The quantization step size for each individual frequency coefficient may be modified to compensate for different scaling that may be effected on each individual frequency coefficient by the specific form of the specific transform implemented to generate the coefficient. The quantization step size may also be modified to achieve equal fidelity of all frequency components. In one example, fidelity is measured objectively in terms of mean squared error (MSE).

In contrast, the programmable constants represented by weightscale may be specified by an encoder user to achieve equal fidelity of all frequency components, but are generally set according to a subjective criteria. For example, the programmable constants may be set to maximize the subjective quality of the encoded video. In general, larger constants are generally used for the higher frequency components due to a gradually diminishing ability to distinguish errors in increasingly high frequencies. In combination, weightscale and normAdjust form the LevelScale, which controls the quantizer step size, which controls how much loss/error is introduced into each frequency component by the encoding and compression process.

In another example, the block 154 may be configured to enforce a joint constraint on the parameters LevelScale and qP. For example, for a user supplied weighting matrix (e.g., values of LevelScale), the parameter qP may be appropriately constrained to the minimum value of LevelScale implemented. In yet further examples, the block 154 may be configured to (i) use some less constraining, simple, arbitrary limits on the parameters LevelScale and qP, (ii) clip the coefficients to 16-bits, (iii) force a PCM mode if the coefficients are too large and/or (iv) specify a different prediction-mode (eg. 8×8 instead of 4×4, etc.) that does not generate a coefficient that is too large (e.g., greater than 16 bits). Optionally, the block 154 may be configured to provide feedback (e.g., warnings) to a user via the UI 156.

In general, the block 154 may be configured to provide similar control for parameters affecting other residual blocks (e.g., 4×4 chroma DC, 4×4 luma DC, 8×8 residual blocks) in order to prevent violation of limits (e.g., video bitdepth+8 bits) specified on the reconstruction process for coefficients, but not directly on the coefficients. The particular numeric values applied in the formulae for the restrictions may differ with each particular restriction that is enforced. However, the method (e.g., constrain weightscale, constrain qP, etc) and the form of the equations (e.g., Eqs. 1 and 2) do not generally differ.

The user input 156 may be configured to present (i) the weighting matrix (e.g., containing LevelScale values), (ii) parameters controlling bitrate, quality, encode-duration and quantizer specification (e.g., indirect or direct control of qP) and (iii) indirect or direct control of GOP, picture-type, macroblock coding mode-type to the block 150. The user input 156 may be further configured to present (i) the weighting matrix, (ii) parameters controlling quantizer specification and (iii) macroblock coding mode-type to the block 152. In one example, the input data stream (e.g., INPUT VIDEO) may comprise an 8-bit "High Profile" compliant stream. However, other types of video streams (e.g., 10-bit "High 10" & "High 422" profiles, and 12-bit "High 444" profile) may be implemented accordingly to meet the design criteria of a particular implementation.

The block 150 may be implemented with conventional motion estimation (ME), prediction and mode decision algorithms to code a 4×4 block as a predicted (e.g., spatial or temporal) 4×4 residual using H.264V2 syntax (e.g., "High Profile"). The block 152 may be configured to form a number of coefficients for 8-bit video that have a width less than 16 bits (or 18 bits and 20 bits for 10-bit and 12-bit video, respectively).

For example, for 8-bit input to the 4×4 transform, real (or reconstructed) residuals (e.g., $r_{ij}$) may be 9-bits, real scaled residuals (e.g., $h_{ij}$) may be 15-bits, and real forward transform outputs, and inverse transform inputs, (e.g., $d_{ij}$) may be 15.53 bits depending on the 4×4 transform implemented. Specifically, the forward transform outputs may be expressed by the following Equation 3:

$$D = 15(h_{ij}) + \log 2(TG4 \times 4), \quad \text{Eq. 3}$$

where TG4×4 represents a gain of the forward transform (e.g., transform_gain). The transform gain TG4×4 may be determined according to the following equations:

$$TG4 \times 4 = TG4 \times 41d'*TG4 \times 41d$$

$$TG4 \times 41d = \text{sum}(abs(inv(e*f))) = [1.0000\ 1.0000\ 1.2000\ 1.2000],$$

where e=[1 0 1 0; 1 0 −1 0; 0 ½ 0 −1; 0 1 0 ½] and f=[1 0 0 1; 0 1 1 0; 0 1 −1 0; 1 0 0 −1]. Applying the above equations, TG4×4=[1 1 1.2 1.2; 1 1 1.2 1.2; 1.2 1.2 1.44 1.44; 1.2 1.2 1.44 1.44] and the real forward transform outputs may have a maximum of 15.53 bits (e.g., 15+log 2(1.2*1.2)). There is generally no overflow in the transform.

The AC coefficients (e.g., $c_{ij}$) for the 4×4 transform (e.g., for qP=0) may be expressed by the following equation:

$$C4 \times 4 = 15(h_{ij}) + 4(\text{shift}) + \log2(TG4 \times 4) - \log2(LS),$$

$$= [15.6781\ 15.2996\ 15.9411\ 15.5626\ 15.2996$$

$$15.0000\ 15.5626\ 15.2630\ 15.9411\ 15.5626**$$

-continued $$16.2041**15.8256\ 15.5626\ 15.2630\ 15.8256$$

$$15.5261],$$

where LS=min_level_scale=[10 13 10 13; 13 16 13 16; 10 13 10 13; 13 16 13 16]. Because the one AC coefficient (e.g., 2,2) has a maximium value of 16.2041 bits, the AC coefficient (2,2) can overflow with 9-bit residuals.

The maximum chroma DC coefficients (e.g., transform gain=1, qp=0, levelscale=10) may be expressed by the following equation:

$$15-\log 2(10)+5=16.68 \text{ bits.}$$

Only the coefficients overflow for chroma DC, not the inverse transform.

The maximum luma DC coefficients (e.g., transform gain 1) may be expressed by the following equation:

$$15-\log 2(10)+6=17.68 \text{ bits}$$

Only the coefficients overflow for luma DC, not the inverse transform

For 8-bit input to the 8×8 transform, real (or reconstructed) residuals (e.g., $r_{ij}$) may be 9-bits, real scaled residuals (e.g., $m_{ij}$) may be 15-bits, and real forward transform outputs (e.g., $d_{ij}$) may be 15.5261 bits. Specifically, the forward transform outputs may be expressed by the following Equation 4:

$$D=15(m_{ij})+\log 2(TG8 \times 8), \quad \text{Eq. 4}$$

where, max(TG8×8)=0.5261. The inverse transform does not overflow with 9-bit residuals (e.g., max is 15.5261 bits). The transform gain TG8×8 may be determined according to the following equations:

$$TG8 \times 8 = TG8 \times 81d' * TG8 \times 81d$$

$$TG8 \times 81d = \text{sum}(abs(inv(h*k*m)))$$
$$= [1\ 0.8581\ 1\ 0.8581\ 1.2\ 0.8581\ 1.2\ .8581],$$

where m=[1 0 0 0 0 0 0 1; 0 0 1 0 0 1 0 0; 0 0 0 1 1 0 0 0; 0 1 0 0 0 0 1 0; 0 −1 0 0 0 0 1 0; 0 0 0 −1 1 0 0 0; 0 0 1 0 0 −1 0 0; 1 0 0 0 0 0 0 −1]; k=[1 0 0 0 0 1 0; 0 1 0 0 0 0 0.25; 0 0 1 0 1 0 0 0; 0 0 0 1 0 0.25 0 0; 0 0 1 0 −1 0 0 0; 0 0 0 0.25 0 −1 0 0; 1 0 0 0 0 −1 0; 0 −0.25 0 0 0 0 0 1]; h=[1 0 0 0 1 0 0 0; 0 0 0 −1 0 1 0 −1.5; 1 0 0 0 −1 0 0 0; 0 1 0 −1.5 0 0 0 1; 0 0 0.5 0 0 0 −1 0; 0 −1 0 0 0 1.5 0 1; 0 0 1 0 0 0 0.5 0; 0 1.5 0 1 0 1 0 0]. Applying the above equalities, TG8×8=TG8× 81d'*TG8×81d=[1.0000 0.8581 1.0000 0.8581 1.2000 0.8581 1.2000 0.8581 0.8581 0.7364 0.8581 0.7364 1.0298 0.7364 1.0298 0.7364 1.0000 0.8581 1.0000 0.8581 1.2000 0.8581 1.2000 0.8581 0.8581 0.7364 0.8581 0.7364 1.0298 0.7364 1.0298 0.7364 1.2000 1.0298 1.2000 1.0298 1.4400 1.0298 1.4400 1.0298 0.8581 0.7364 0.8581 0.7364 1.0298 0.7364 1.0298 0.7364 1.2000 1.0298 1.2000 1.0298 1.4400 1.0298 1.4400 1.0298 0.8581 0.7364 0.8581 0.7364 1.0298 0.7364 1.0298 0.7364]. The transform does not overflow internally due to the size of the individual sum(abs(inv(h))), sum(abs(inv(k))).

The AC coefficients (e.g., cij) for the 8×8 transform may be expressed by the following equation:

$$C8 \times 8 = 15(mij) + 6(\text{shift}) + \log2(TG8 \times 8) - \log2(LS8 \times 8),$$

$$= [16.6781\ 16.5313\ 16.3561\ 16.5313\ 16.9411\ 16.5313$$
$$16.6192\ 16.5313\ 16.5313\ 16.3886\ 16.1943\ 16.3886$$
$$16.7944\ 16.3886\ 16.4573\ 16.3886\ 16.3561\ 16.1943$$
$$16.0000\ 16.1943\ 16.6192\ 16.1943\ 16.2630\ 16.1943$$
$$16.5313\ 16.3886\ 16.1943\ 16.3886\ 16.7944\ 16.3886$$
$$16.4573\ 16.3886\ 16.9411\ 16.7944\ 16.6192\ 16.7944$$
$$17.2041\ 16.7944\ 16.8822\ 16.7944\ 16.5313\ 16.3886$$
$$16.1943\ 16.3886\ 16.7944\ 16.3886\ 16.4573\ 16.3886$$
$$16.6192\ 16.4573\ 16.2630\ 16.4573\ 16.8822\ 16.4573$$
$$16.5261\ 16.4573\ 16.5313\ 16.3886\ 16.1943\ 16.3886$$
$$16.7944\ 16.3886\ 16.4573\ 16.3886],$$

where L=[20 19 25 19 20 19 25 19; 19 18 24 18 19 18 24 18; 25 24 32 24 25 24 32 24; 19 18 24 18 19 18 24 18] and LS8×8=[L;L]. From the above equation, all of the 8×8 AC coefficients can overflow (by various amounts). However the transform does not overflow with 9-bit residuals.

Figure 3:
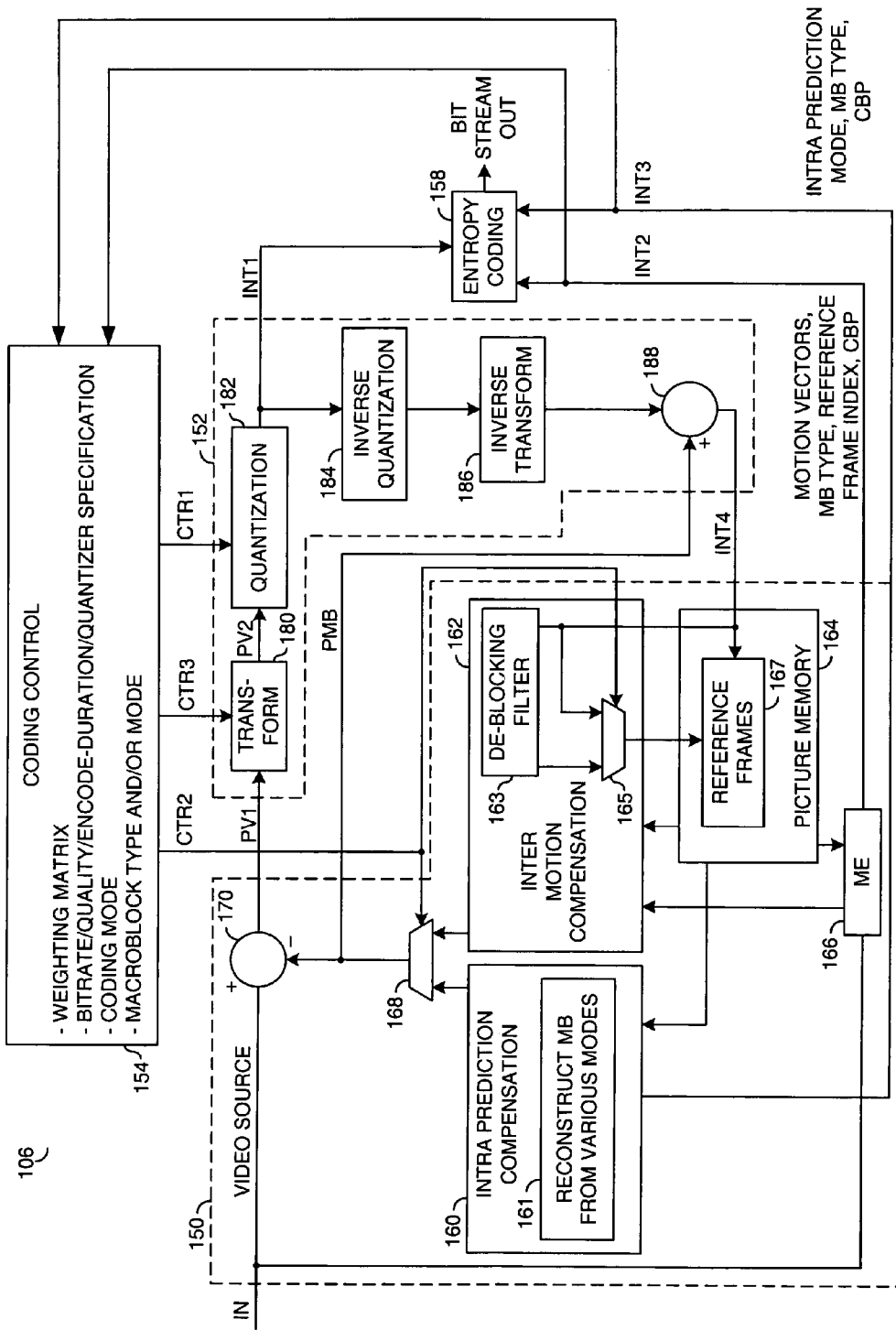
FIG. 3 is a block diagram illustrating an example implementation of an encoder of FIG. 2.

Referring to FIG. 3, a detailed block diagram is shown illustrating an example implementation of the encoder 106 of FIG. 2. In one example, the encoder user input 156 may be incorporated into the control block 154. In one example, the block 150 may have a first input that may receive an input signal (e.g., IN), a second input that may receive a signal (e.g., CTR2), a third input that may receive a signal (e.g., INT4), a first output that may present a signal (e.g., PV1), a second output that may present a signal (e.g., PMB), a third output that may present a signal (e.g., INT2), and a fourth output that may present a signal (e.g., INT3). The block 152 may have a first input that may receive the signal PV1, a second input that may receive the signal PMB, a third input that may receive a signal (e.g., CTR1) a fourth input that may receive a signal (e.g., CTR3), a first output that may present a signal (e.g., INT1) and a second output that may present the signal INT4. The block 154 may have a number of inputs that may receive the signals INT2 and INT3, and a number of outputs that may present the signals CTR1, CTR2 and CTR3. The signals CTR1, CTR2 and CTR3 may be implemented as control signals. The signals CTR1, CTR2 and CTR3 may control (or provide) one or more parameters such as weighting matrix (e.g., LevelScale values), bitrate, quality, and/or encode-duration. One or more of the signals CTR1, CTR2 and CTR3 may be configured (i) to indirectly or directly control the parameter qP (e.g., quantizer specification) and/or (ii) to indirectly or directly control group of pictures (GOP), picture type, macroblock coding mode, macroblock type, and other coding decision and/or coefficient formation selections (or decisions).

In one example, the block 150 may comprise a block (or circuit) 160, a block (or circuit) 162, a block (or circuit) 164, a block (or circuit) 166, a block (or circuit) 168 and a block (or circuit) 170. The circuit 160 may be implemented as an intra prediction compensation circuit. The circuit 160 may include a block 161. The block 161 may be configured to reconstruct macroblocks from various macroblock modes. The circuit 160 may have an output that may present the signal INT3. The signal INT3 may contain one or more control signals. The control signals may include intra prediction mode information, macroblock type, coded block pattern (CBP), etc.

The circuit 162 may be implemented as an inter motion compensation circuit. The circuit 162 may also include a block (or circuit) 163 and a block (or circuit) 165. The block 163 may be implemented as a de-blocking filter. The circuit 165 may be implemented as a multiplexer, such as a 2-1 multiplexer. The circuit 165 may be configured to select between an output of the de-blocking filter 163 and a bypass of the de-blocking filter 163. The circuit 164 may be implemented as a picture memory circuit. The circuit 164 may include a block (or circuit) 167. The block 167 may be implemented to store one or more reference frames.

The circuit 166 may be implemented as a motion estimation (ME) circuit. The circuit 166 may have an output that may present the signal INT2. The signal INT2 may contain one or more control signals. The control signals may include motion vectors, macroblock type, reference frame index, coded block pattern (CBP) information, etc. The circuit 168 may be implemented as a multiplexer, such as a 2-1 multiplexer. The circuit 170 may be implemented as a subtractor circuit. The circuit 170 generally subtracts a predicted macroblock (e.g., from the signal PMB) from an input video signal (e.g., IN) to generate the signal PV1. The signal PV1 may comprise residual 4×4 and/or 8×8 blocks.

The processing circuit 152 generally comprises a block (or circuit) 180, a block (or circuit) 182, a block (or circuit) 184, a block (or circuit) 186 and a block (or circuit) 188. The block 180 may be implemented as a transform circuit. In one example, the block 180 may be configured to select between a 4×4 transformation and an 8×8 transformation in response to the signal CTR3. The block 180 may be configured to generate a signal (e.g., PV2) comprising one or more transformed block coefficients in response to the signal PV1 and the signal CTR3.

The block 182 may be implemented as a quantization circuit. The block 182 may be configured to generate the signal INT1 comprising one or more quantized block coefficients in response to the signal PV2 and the signal CTR1. The block 184 may be implemented as an inverse quantization circuit. The inverse quantization circuit 184 may be configured to reverse the quantization process previously performed on the data set (e.g., the signal PV2) by the circuit 182. The inverse quantization circuit 184 generally builds a matrix of values used by the block 186. The block 186 may be implemented as an inverse transform circuit. The inverse transform circuit 186 generally reverses the transformation process performed by the block 180, transforming the data set to the spatial domain. The block 188 may be implemented as a summing block. The block 188 may be configured to add the output of the block 186 with the signal PMB to generate the signal INT4 comprising reconstructed samples.

In one example, the encoder 106 may implement H.264 forward transform and quantization similar to that described in the Joint Video Team (JVT) document JVT-B039.doc entitled "Low Complexity Transform and Quantization—Part II: Extensions" (which is hereby incorporated by reference in its entirety). In one example, a forward transform for 4×4 luma and chroma may be defined by the following equation:

$$R = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} C_{00} & C_{01} & C_{02} & C_{03} \\ C_{10} & C_{11} & C_{12} & C_{13} \\ C_{20} & C_{21} & C_{22} & C_{23} \\ C_{30} & C_{32} & C_{32} & C_{33} \end{bmatrix} \begin{bmatrix} 1 & 2 & 1 & 1 \\ 1 & 1 & -1 & -2 \\ 1 & -1 & -1 & 2 \\ 1 & -2 & 1 & -1 \end{bmatrix}$$

Quantization for the 4×4 luma and chroma may be performed according to the following equations:

$$R_{QQ}(i,j)=[R(i,j) \cdot Q(QP\%6,i,j)+(((\text{Off}(i,j)+1) \cdot 2^{17+QP/6})/16]/2^{17-3+QP/6}, i,j=0 \ldots 3$$

$$R_Q(i,j)=\{0, \text{ if } abs(R_{QQ}(i,j)) \leq 7+DZ(i,j)R_{QQ}(i,j)/8, \text{ else}$$

where R represents the transformed coefficients, Q represents the quantization coefficients, Off(i,j) represents offset values having the same sign as the coefficient that is being quantized and a value +1 is added to the parameter Off(i,j). In one example, the quantization coefficients Q may be set as follows:

Q[QP%6][i][j]=quantMat[QP%6][0] for (i,j)={(0,0), (0,2), (2,0), (2,2)},
Q[QP%6][i][j]=quantMat[QP%6][1] for (i,j)={(1,1), (1,3), (3,1), (3,3)},
Q[QP%6][i][j]=quantMat[QP%6][2] otherwise.
R[QP%6][i][j]=dequantMat[QP%6][0] for (i,j)={(0,0), (0,2), (2,0), (2,2)},
R[QP%6][i][j] dequantMat[QP%6][1] for (i,j)={(1,1), (1,3), (3,1), (3,3)},
R[QP%6][i][j]=dequantMat[QP%6][2] otherwise.
quantMat[6][3]={{13107, 5243, 8066}, {11916, 4660, 7490}, {10082, 4194, 6554}, {9362, 3647, 5825}, {8192, 3355, 5243}, {7282, 2893, 4559}};
dequantMat[6][3]={{10, 16, 13}, {11, 18, 14}, {13, 20, 16}, {14, 23, 18}, {16, 25, 20}, {18, 29, 23}}.

For 4×4 luma DC transformation and quantization, the luma DC coefficients of a 16×16 block may be grouped into a 4×4 block and further transformed, for intra frames, to improve compression. The forward transform for 4×4 luma DC transformation may be implemented as follows. The input matrix $C_D$ may be formed by picking out DC coefficients from the 16 transformed 4×4 blocks. DC coefficients may be transformed, for example, using a symmetric Hadamard transform. The symmetric Hadamard transform generally leads to essentially the same performance as the DCT-like transform in TML. The forward transform may be expressed by the following equation:

$$R = \begin{bmatrix} 1 & 1 & 1 & 1 \\ 1 & 1 & -1 & -1 \\ 1 & -1 & -1 & 1 \\ 1 & -1 & 1 & -1 \end{bmatrix} \begin{bmatrix} C_{D00} & C_{D01} & C_{D02} & C_{D03} \\ C_{D10} & C_{D11} & C_{D12} & C_{D13} \\ C_{D20} & C_{D21} & C_{D22} & C_{D23} \\ C_{D30} & C_{D32} & C_{D32} & C_{D33} \end{bmatrix} \begin{bmatrix} 1 & 1 & 1 & 1 \\ 1 & 1 & -1 & -1 \\ 1 & -1 & -1 & 1 \\ 1 & -1 & 1 & -1 \end{bmatrix} // k_p$$

with $k_p=k_9=2$ and the symbol // represents division with rounding to the nearest integer. The value p is generally related to a bitdepth of the input video. For example for 8-bit video the value $k_9$ is implemented. However, other values may be implemented for 10-bit and/or 12-bit input video.

The 4×4 luma DC quantization may be performed according to the following equations:

$$R_{QQD}(i,j)=[R(i,j) \cdot Q(QP\%6,0,0)+((SGN(R_D(i,j)) \cdot (o_{LDC}+1) \cdot 2^{17+QP/6})/16]/2^{17-3+QP/6}, i,j=0 \ldots 3$$

$$R_{QD}(i,j)=\{0, \text{ if } abs(R_{QQD}(i,j)) \leq 7+d_{LDC}R_{QQD}(i,j)/8, \text{ else}$$

where $o_{LDC}=0 \ldots 7$, $d_{LDC}=0 \ldots 15$ (e.g., $o_{LDC}=7$, $d_{LDC}=0$).

The 2×2 chroma DC transform and quantization may be implemented as follows. In one example, the forward transform may be implemented by adding the chroma DC transform on top of the chroma transform. The input matrix may be formed by picking out DC coefficients from the 4 transformed 4×4 blocks. For example, denoting the coefficients as $X_D$, the transform may be computed according to the following equation.

$$R_D = \left( \begin{bmatrix} 1 & 1 \\ 1 & -1 \end{bmatrix} \begin{bmatrix} C_{D00} & C_{D01} \\ C_{D10} & C_{D11} \end{bmatrix} \begin{bmatrix} 1 & 1 \\ 1 & -1 \end{bmatrix} \right) // k_p$$

with $k_p=k_9=1$.

The 2×2 chroma DC quantization may performed according to the following equation:

$$R_{QQD}(i,j)=[R(i,j) \cdot Q(QP\%6,0,0)+((SGN(R_D(i,j)) \cdot (o_{CDC}+1) \cdot 2^{17+QP/6})/16]/2^{17-3+QP/6}, i,j=0 \ldots 3$$

$$R_{QD}(i,j)=\{0, \text{ if } abs(R_{QQD}(i,j)) \leq 7+d_{CDC}R_{QQD}(i,j)/8, \text{ else}$$

where $O_{CDC}=0 \ldots 7$, $d_{CDC}=0 \ldots 15$ (e.g., $O_{CDC}=7$, $d_{CDC}=0$).

The dynamic range specifications for each stage may be summarized in the following TABLE 1:

TABLE 1

| | Precision | |
|---|---|---|
| | Input bits | Output bits |
| Luma and chroma transform and quantization | | |
| Forward transform | 9 | 15 |
| Quantization | 15 | 10 |
| De-quantization | 10 | 15 |
| Inverse transform | 15 | 9 |
| Luma DC transform and quantization | | |
| transform | 13 | 16 |
| Quantization | 16 | 12 |
| Inverse transform | 12 | 12 |
| De-quantization | 12 | 15 |
| Chroma DC transform and quantization | | |
| transform | 13 | 15 |
| Quantization | 15 | 11 |
| Inverse transform | 11 | 11 |
| De-quantization | 11 | 15 |

The value in each cell generally corresponds to a 9-bit input residual.

Although the present invention has been illustrated with an 8-bit video input, other bitdepths (e.g., 10-bit, 12-bit, etc.) of input video streams may be implemented in accordance with the present invention, as will be apparent to those skilled in the relevant art(s). The present invention may also be implemented with other video formats (e.g., 4:2:2, 4:4:4, etc.).

The function performed by the present invention may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of application specific integrated circuits (ASICs), application specific standard products (ASSPs), field-programmable gate arrays (FPGAs), or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMS, EPROMS, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for coefficient bitdepth limitation comprising the steps of:
   generating one or more residual block coefficients in an encoder in response to a video signal and one or more coding parameters, wherein said encoder has a mode that generates a H.264-AVC FRExt High Profile compliant compressed bitstream in response to said one or more residual block coefficients; and
   manipulating said one or more coding parameters such that a combination of quantization parameter values and weighting matrix values is greater than a predetermined maximum potential overflow threshold for a current block or coefficient, wherein the manipulation of said one or more coding parameters prevents residual 4×4 coefficient blocks from having values greater than a bitdepth of said video signal plus eight bits in the H.264-AVC FRExt High Profile compliant mode.

2. The method according to claim 1, wherein said video signal has a profile selected from the group consisting of 8-bit High Profile, 10-bit High 10 profile, 10-bit High 422 profile and 12-bit High 444 profile.

3. The method according to claim 1, wherein said one or more coding parameters comprise one or more parameters selected from the group consisting of quantization parameter (qP), weightscale, bitrate, quality, encode-duration and macroblock mode.

4. The method according to claim 1, wherein said one or more residual block coefficients further comprise one or more coefficients selected from the group consisting of 4×4, 4×4 luma DC, 4×4 chroma DC and 8×8 residual blocks.

5. The method according to claim 1, wherein a weighting matrix coefficient is set to a value greater than or equal to a predetermined minimum value determined when a quantization parameter (qP) is set equal to zero.

6. The method according to claim 1, wherein a weighting matrix coefficient is set to a value greater than or equal to a predetermined minimum value determined when a quantization parameter (qP) is set to a value greater than or equal to two.

7. The method according to claim 1, wherein a quantization parameter (qP) is set to a value substantially equal to a minimum value for a predetermined weighting matrix coefficient.

8. The method according to claim 1, wherein said coding parameters are configured to clip said residual block coefficients.

9. The method according to claim 1, wherein said coding parameters are manipulated to select a prediction mode that does not cause an overflow.

10. An encoder apparatus comprising:
    means for generating one or more residual block coefficients in response to a video signal and one or more coding parameters, wherein the generating means has a mode that generates a H.264-AVC FRExt High Profile compliant compressed bitstream in response to said one or more residual block coefficients; and
    means for manipulating said one or more coding parameters such that a combination of quantization parameter values and weighting matrix values is greater than a predetermined maximum potential overflow threshold for a current block or coefficient, wherein the manipulation of said one or more coding parameters prevents residual 4×4 coefficient blocks from having values greater than a bitdepth of said video signal plus eight bits in the H.264-AVC FRExt High Profile compliant mode.

11. An encoder apparatus comprising:
    an encoding circuit configured to generate one or more residual block coefficients in response to a video signal and one or more coding parameters, wherein said encoding circuit has a mode that generates a H.264-AVC FRExt High Profile compliant compressed bitstream in response to said one or more residual block coefficients; and
    a control circuit configured to manipulate said one or more coding parameters such that a combination of quantization parameter values and weighting matrix values is greater than a predetermined maximum potential overflow threshold for a current block or coefficient, wherein the manipulation of said one or more coding parameters prevents residual 4×4 coefficient blocks from having values greater than a bitdepth of said video signal plus eight bits in the H.264-AVC FRExt High Profile compliant mode.

12. The encoder apparatus according to claim 11, wherein said encoding circuit comprises:
    a coefficient forming circuit configured to generate said one or more residual block coefficients in response to one or more residual coefficients; and
    a coding decision circuit configured to generate said residual coefficients in response to said video signal and said one or more coding parameters.

13. The encoder apparatus according to claim 11, wherein said video signal has a profile selected from the group consisting of 8-bit High Profile, 10-bit High 10 profile, 10-bit High 422 profile and 12-bit High 444 profile.

14. The encoder apparatus according to claim 11, wherein said one or more coding parameters comprise one or more parameters selected from the group consisting of quantization parameter (qP), weightscale, bitrate, quality, encode-duration and macroblock mode.

15. The encoder apparatus according to claim 11, wherein said one or more residual block coefficients further comprise one or more coefficients selected from the group consisting of 4×4, 4×4 luma DC, 4×4 chroma DC and 8×8 residual blocks.

16. The encoder apparatus according to claim 11, wherein said control circuit is configured to set a weighting matrix coefficient to a value greater than or equal to a predetermined minimum value determined when a quantization parameter (qP) is equal to zero.

17. The encoder apparatus according to claim 11, wherein said control circuit is configured (i) to set a weighting matrix coefficient to a value greater than or equal to a predetermined minimum value determined when a quantization parameter (qP) is set to a value greater than or equal to two.

18. The encoder apparatus according to claim 11, wherein said control circuit is configured to set a quantization parameter (qP) to a value substantially equal to a minimum value for a predetermined weighting matrix coefficient.

19. The encoder apparatus according to claim 11, wherein said control circuit is configured to clip said residual block coefficients.

20. The encoder apparatus according to claim 11, wherein said control circuit is configured to select a prediction mode that does not cause an overflow.

* * * * *